United States Patent [19]

Kobari et al.

[11] 4,305,026
[45] Dec. 8, 1981

[54] DEVICE FOR DRIVING A DC MOTOR WITH FEEDBACK CONTROL

[75] Inventors: Katsuo Kobari, Tachikawa; Yoshiaki Hachisuka, Hachioji, both of Japan

[73] Assignee: Fujitsu Fanuc Limited, Tokyo, Japan

[21] Appl. No.: 123,710

[22] Filed: Feb. 22, 1980

[30] Foreign Application Priority Data

Mar. 6, 1979 [JP] Japan .................................. 54-25036

[51] Int. Cl.³ .............................................. H02P 5/16
[52] U.S. Cl. ...................................... 318/398; 318/327
[58] Field of Search ............... 318/398, 332, 327, 326, 318/397, 328

[56] References Cited

U.S. PATENT DOCUMENTS

| 3,317,806 | 5/1967 | Farinelli et al. | 318/398 |
| 3,599,063 | 8/1971 | Nani et al. | 318/398 |
| 3,735,225 | 5/1973 | Raatz | 318/332 |

Primary Examiner—David Smith, Jr.
Attorney, Agent, or Firm—Armstrong, Nikaido, Marmelstein & Kubovcik

[57] ABSTRACT

A device for driving a DC motor with feedback control provides a circuit for judging whether the motor is in acceleration or in deceleration and a circuit for switching the gain modification signal, and said switch circuit is controlled by the output signals of said judgement circuit.

2 Claims, 2 Drawing Figures 4,305,026

DEVICE FOR DRIVING A DC MOTOR WITH FEEDBACK CONTROL

TECHNICAL FIELD

The present invention relates to a device for driving a DC motor with feedback control. The device of the present invention is used for realizing various ways of speed control of a DC motor.

In general, in order to drive a DC motor of, for Example, a shunt type, the voltage supplied to the motor is controlled in such a manner that the difference between the speed command value and the speed feedback value is amplified with proportional and integral actions and said amplified difference is supplied to the motor. In the speed range in which the counter electromotive force of the motor is relatively small in comparison with the driving power source voltage, the feedback control of the motor can be effected with a predetermined gain of the control circuit. However, in the high speed range in which the counter electromotive force of the motor is relatively large in comparison with the driving power source voltage, the feedback control of the motor is effected with a reduced gain in the acceleration of the motor and an increased gain in the deceleration of the motor. The reduction of gain in the acceleration of the motor causes a disadvantageous extension of the acceleration period, while the increase of gain in the deceleration of the motor causes a disadvantageous occurrence of a spark in the commutator of the motor and accordingly an unstable operation of the control circuit.

In the prior art circuit shown in FIG. 1, the problems mainly regarding the deceleration of the motor were partly solved. In the circuit of FIG. 1, the speed feedback signal $S_f$ produced in the tacho generator 2 coupled to the DC motor 1 is supplied directly to the forward gain modifying bias adder 12 and is supplied through the inverter circuit 11 to the backward gain modifying bias adder 13. As a result, these supplied signals reduce the values of the bias signals 9 and 10 supplied to these adders 12 and 13, and accordingly, the forward gain of the system in the deceleration of the motor is reduced. Thus, in the circuit of FIG. 1, disadvantages such as a spark occurring in the commutator because of an increase of the gain of the system in the deceleration of the motor and an excess current passing through the system due to an oscillation state of the system which causes the system to be unstable, are avoided. However, the circuit of FIG. 1 deals with only the problem of the increase of the gain of the system in the deceleration of the motor, but does not deal with the problem of the reduction of the gain of the system in the acceleration of the motor. A problem of unsatisfactory control characteristics due to the reduction of the gain of the system in the acceleration of the motor remains in the circuit of FIG. 1.

DISCLOSURE OF THE INVENTION

The present invention is proposed in order to solve the above described problem.

It is the principal object to prevent a reduction of the gain of the system in the acceleration of the motor, to reduce the acceleration time, and accordingly, to improve the control characteristic of a DC motor of the feedback control type.

In accordance with the present invention, a device for driving a DC motor with feedback control is provided in which said device comprises an amplifier circuit with proportional and integral actions to which the signal representing the difference between the speed command signal and the speed feedback signal is applied, adders which receive the output signal of said amplifier circuit, power amplifier circuits which receive the output signal of said adders, respectively, and an adder which receives the output signals of said power amplifier circuits, and said device for driving a DC motor with feedback control further comprises a circuit for judging whether the motor is in acceleration or in deceleration and a circuit for switching gain modification signals, wherein said judgement circuit receives the speed command or the speed feedback signal and the output signal of said amplifier circuit, and said switch circuit receives the output signal of said judgement circuit.

DESCRIPTION OF THE PREFERRED EMBODIMENTS

Figure 1:
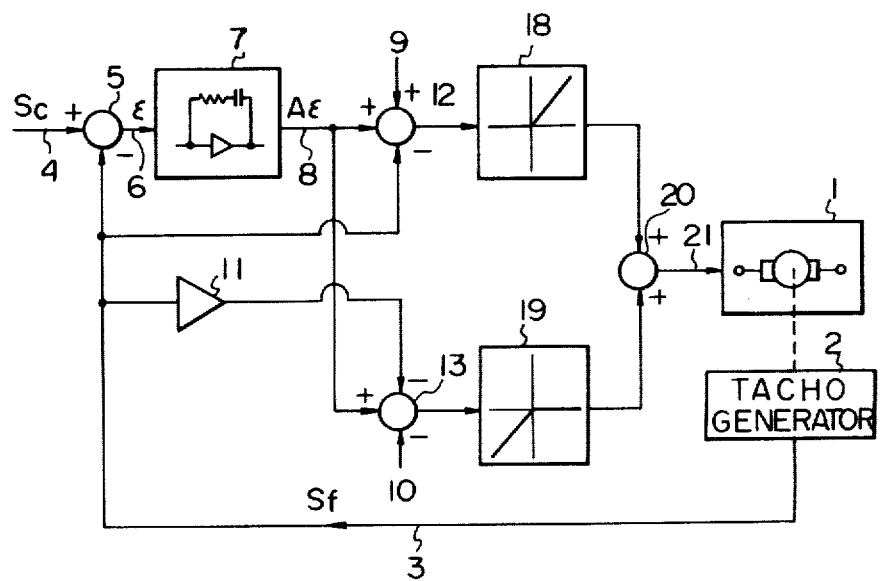
FIG. 1 is a schematic diagram of the circuit used in the prior art device for driving a DC motor with feedback control.

A preferred embodiment of the present invention will now be described hereinafter with reference to FIG. 2. A speed command signal $S_c$ is reduced by the value of a speed feedback signal $S_f$ in the adder 5. The output ($\epsilon$) 6 of the adder 5 is supplied to an amplifier circuit 7 with proportional and integral actions which produces an output (A $\epsilon$) 8 which is proportional to the value $\epsilon$ of the signal 6. The value $\epsilon$ is the difference between the speed command signal $S_c$ and the speed feedback signal $S_f$, and the value A is the gain of the proportional and integral amplifying circuit 7. The output signal 8 is supplied to the adders 12 and 13 to which bias signals 9 and 10 are supplied, respectively. The output signals of the adders 12 and 13 are supplied to a forward power amplifier 18 and a backward power amplifier 19, respectively. The outputs of the forward and backward power amplifiers 18 and 19 are summed in the adder 20 to produce and output signal 21 of the feedback control circuit which is supplied to the DC motor 1.

Figure 2:
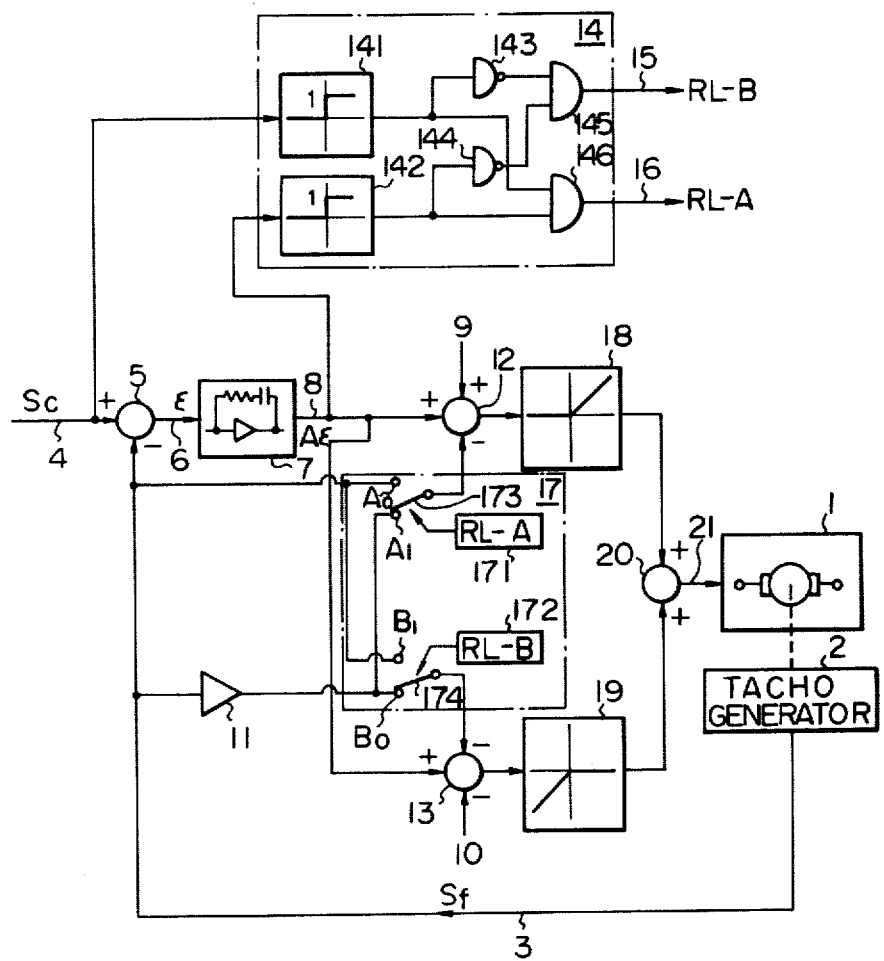
FIG. 2 is a schematic diagram of the circuit in accordance with an embodiment of the present invention.

In accordance with a characteristic of the present invention, a circuit 14 for judging whether the motor is in acceleration or in deceleration and a circuit 17 for switching gain modification signals are provided in the feedback control circuit of FIG. 2. In the circuit 14, the judgement of the polarities of the signal $S_c$ and the signal A$\epsilon$ is effected by the polarity judging circuits 141 and 142. The polarity judging circuit 141 produces the output signal "0" in accordance with a negative input signal representing a backward rotation command and produces the output signal "1" in accordance with a positive input signal representing a forward rotation command. The polarity judging circuit 142 produces the output signal "0" in accordance with a negative input signal representing a negative value of A$\epsilon$ in the case where the speed feedback signal $S_f$ is greater than the speed command signal $S_c$, and produces the output signal "1" in accordance with a positive input signal representing a positive value of A$\epsilon$ in the case where the speed command signal $S_c$ is greater than the speed feedback signal $S_f$.

The output signals of the polarity judging circuits 141 and 142 are judged by NOT gates 143 and 144 and AND gates 145 and 146. The AND gate 146 produces the output signal "1" only when both of the output signals of the polarity judging circuits 141 and 142 are "1", while the AND gate 145 produces the output signal "0". In this case, a contact $A_1$ is closed due to the energization of a relay RL-A receiving the output signal "1" of the AND gate 146 and a contact $B_0$ is closed due to the de-energization of a relay RL-B receiving the output signal "0" of the AND gate 145. Contrary to this, the AND gate 145 produces the output signal "1" only when both of the output signals of the polarity judging circuits 141 and 142 are "0", while the AND gate 146 produces the output signal "0". In this case, a contact $B_1$ is closed due to the energization of the relay RL-B receiving the output signal "1" of the AND gate 145 and a contact $A_0$ is closed due to the de-energization of the relay RL-A.

When the output signals of the polarity judging circuits 141 and 142 are either the same "1" or the same "0", the polarity of the speed command signal $S_c$ and the polarity of the value $A\epsilon$, which is equal to $A(S_c-S_f)$, are one of the two cases below:

$$S_c>0 \text{ and } A(S_c-S_f)>0 \quad (1)$$

$$S_c<0 \text{ and } A(S_c-S_f)<0 \quad (2)$$

It should be noted that both of these cases are when the motor is to be accelerated. Accordingly, the state of the acceleration of the motor is judged by the circuit of FIG. 2, and accordingly, the summations of the speed feedback value in the adders 12 and 13 are carried out.

It should be noted that both of these cases are when the motor is to be accelerated. Accordingly, the state of the acceleration of the motor is judged by the circuit of FIG. 2, and accordingly, the summations of the speed feedback value in the adders 12 and 13 are carried out.

It is also possible to use the speed feedback signal $S_f$ and the signal $A\epsilon$, instead of the speed command signal $S_c$ and the signal $A\epsilon$, for the input signals of the judging circuit 14.

What is claimed is:

1. A device for driving a DC motor with feedback control comprising an amplifier circuit for performing proportional and integral operations on a signal representing the difference between a speed command signal and a speed feedback signal, first adder means for receiving the output signal of said amplifier circuit, power amplifier circuits for receiving the output signals of said first adder means respectively, and second adder means for receiving the output signals of said power amplifier circuits, characterized in that said device further comprises judgement circuit means for judging whether the motor is accelerating or decelerating and switching circuit means for switching gain modification signals, wherein said judgement circuit means receives the speed command signal and the output signal of said amplifier circuit, and said switching circuit means receives the output signal of said judgement circuit means and switches said gain modification signal in response thereto.

2. A device for driving a DC motor with feedback control comprising an amplifier circuit for performing proportional and integral operations on a signal representing the difference between a speed command signal and a speed feedback signal, first adder means for receiving the output signal of said amplifier circuit, power amplifier circuits for receiving the output signals of said first adder means, respectively, and second adder means for receiving the output signals of said power amplifier circuits, characterized in that said device further comprises judgement circuit means for judging whether the motor is accelerating or decelerating and switching circuit means for switching gain modification signals, wherein said judgement circuit means receives the speed feedback signal and the output signal of said amplifier circuit, and said switching circuit means receives the output signal of said judgement circuit means and switches said gain modification signal in response thereto.

* * * * *